Sept. 20, 1949.　　　　K. W. HALL　　　　2,482,338
MOLDING PRESS
Filed June 12, 1945　　　　　　　　　　　9 Sheets-Sheet 1
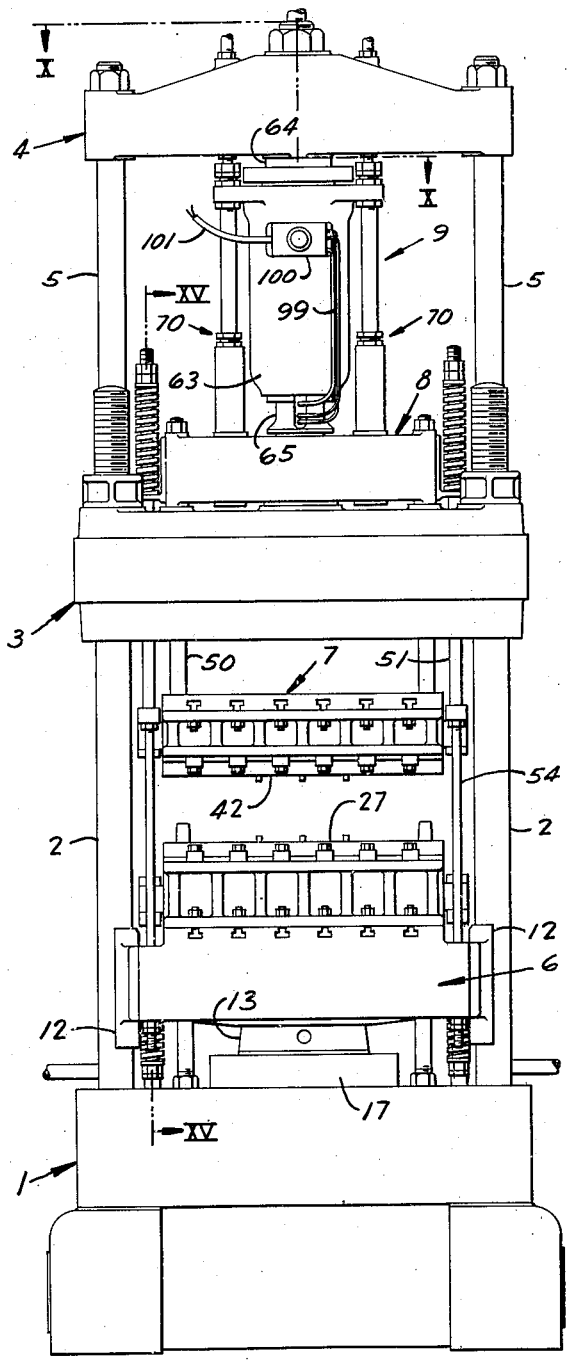
Fig. I
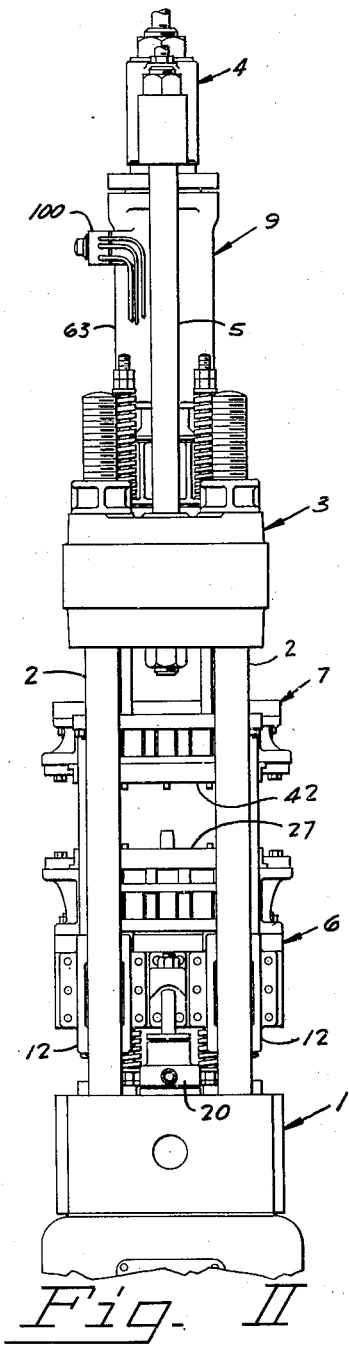
Fig. II
INVENTOR.
Keith W. Hall
BY
Marshall & Marshall
ATTORNEYS

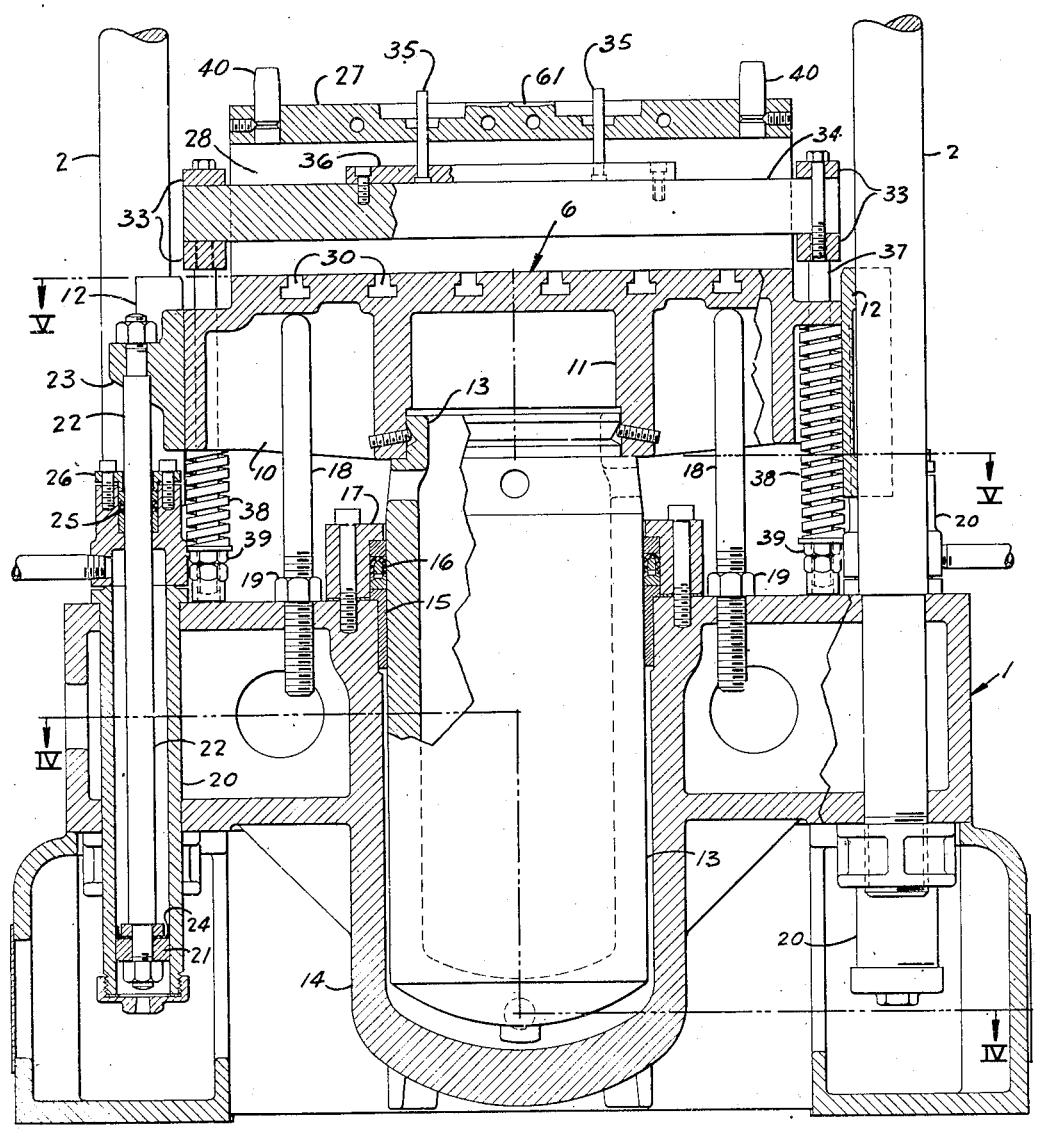

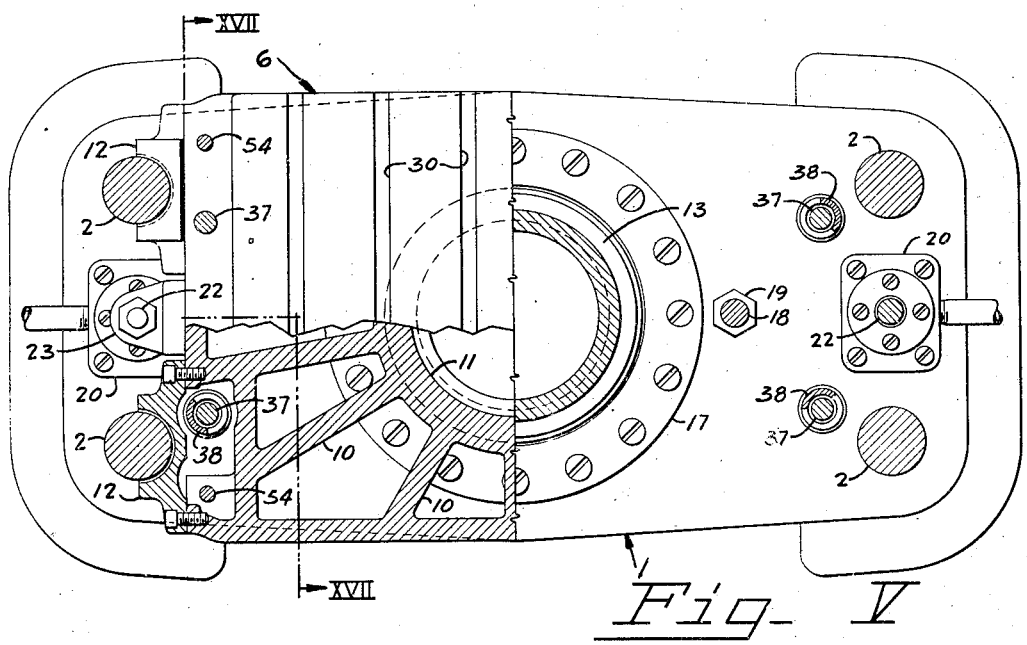
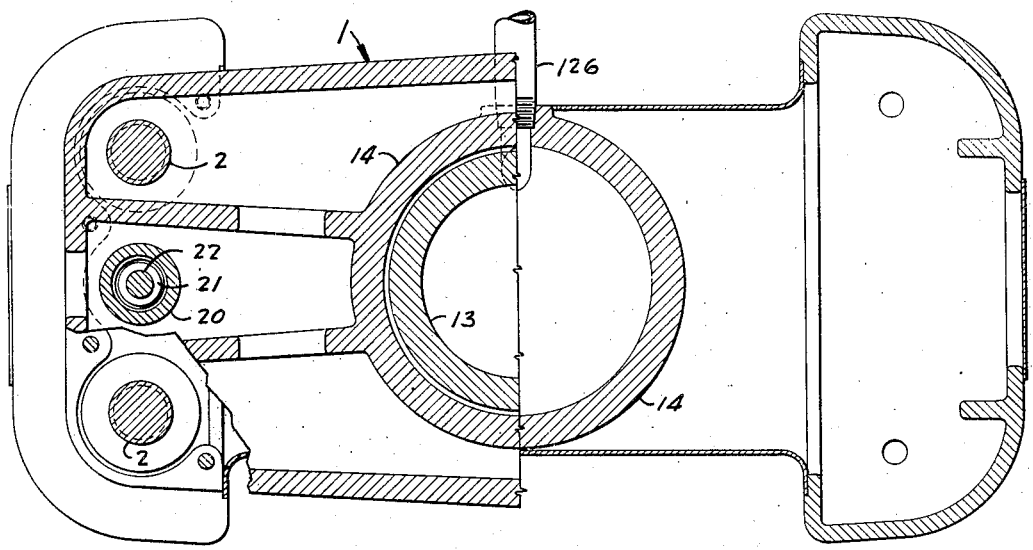

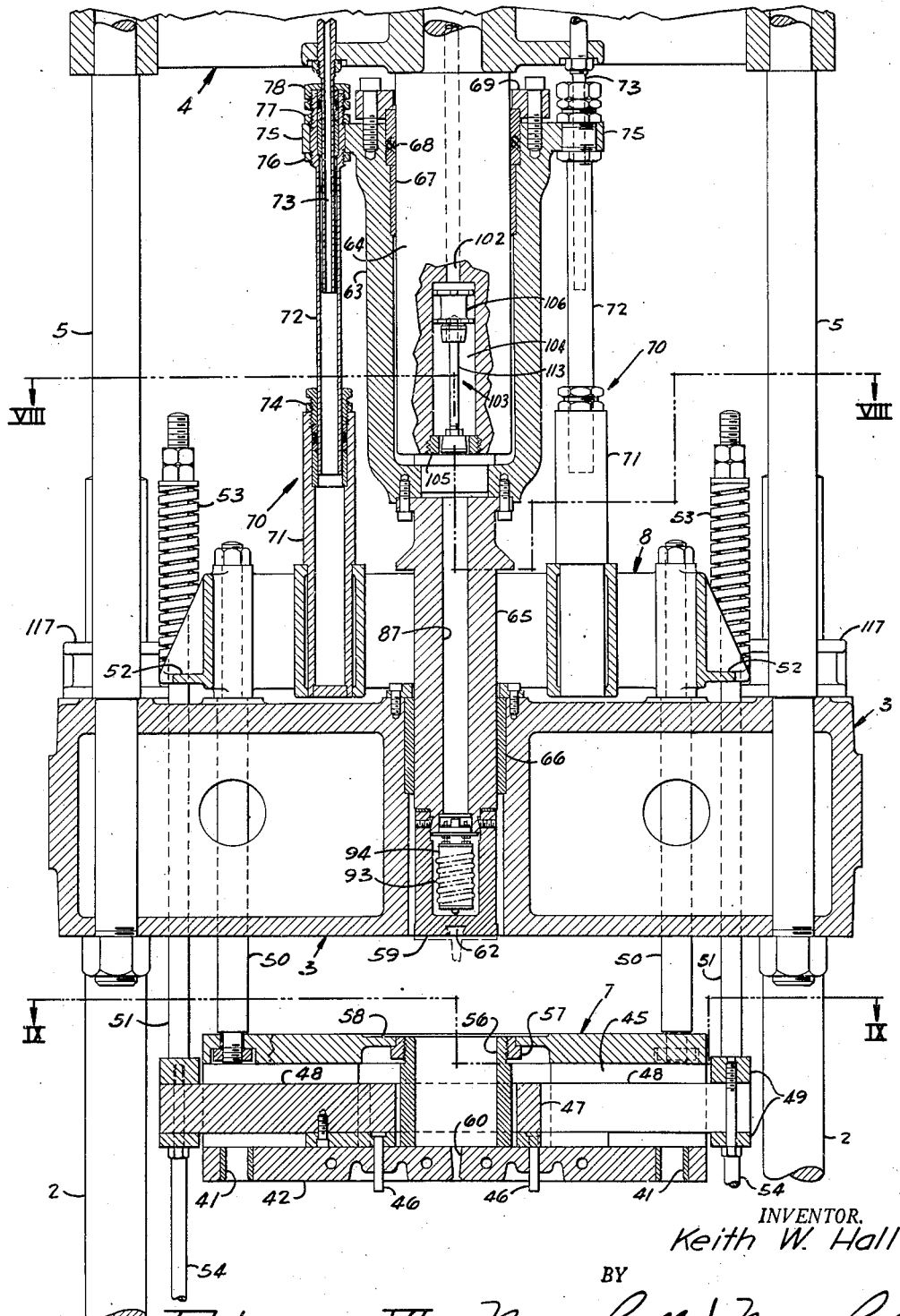

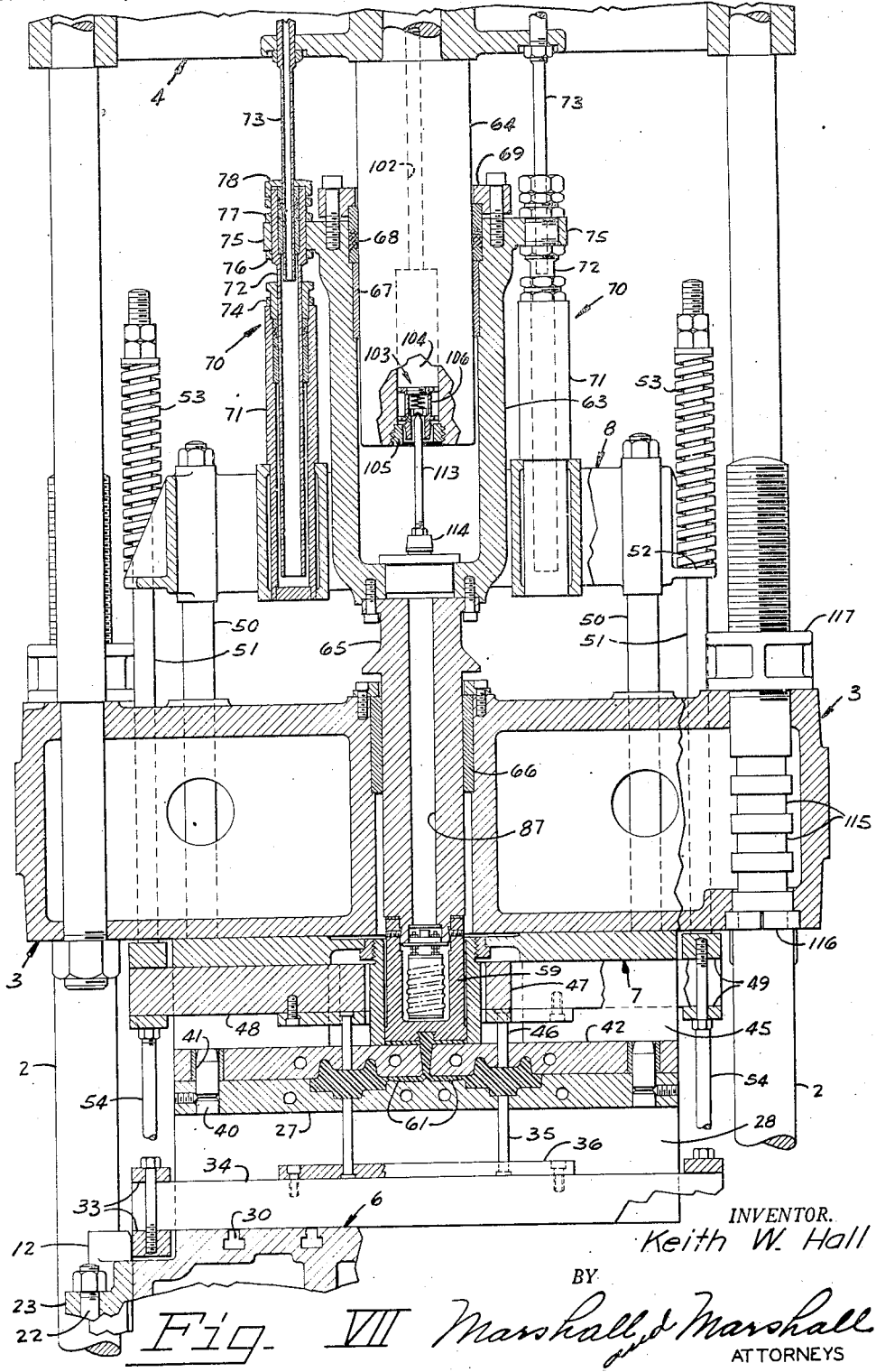
Fig. VII

Sept. 20, 1949.  K. W. HALL  2,482,338
MOLDING PRESS
Filed June 12, 1945  9 Sheets-Sheet 6
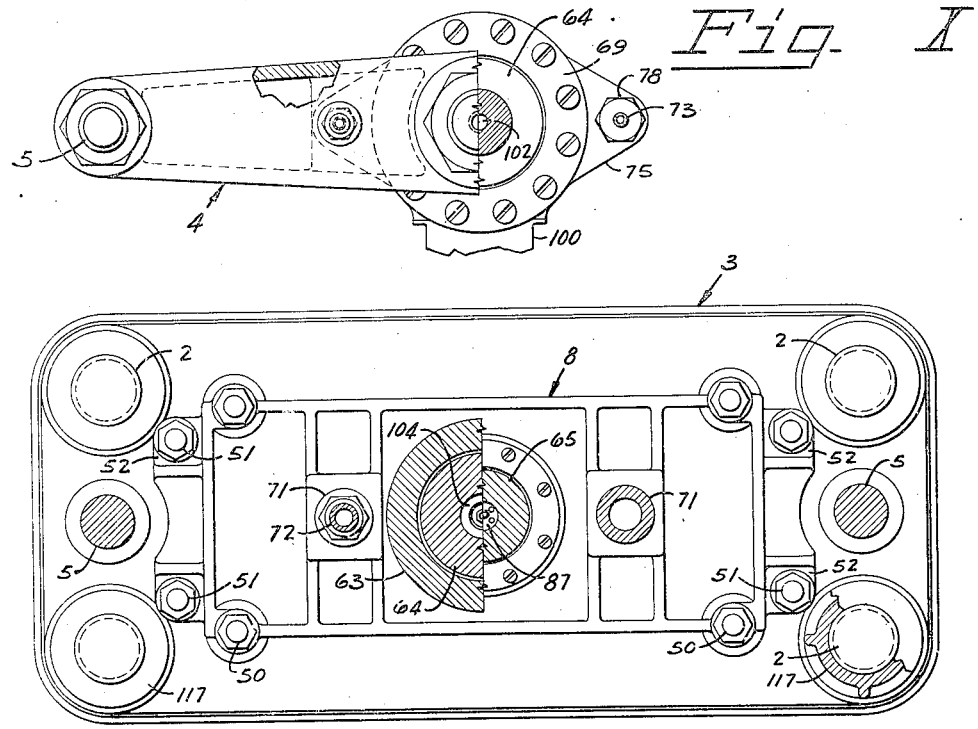
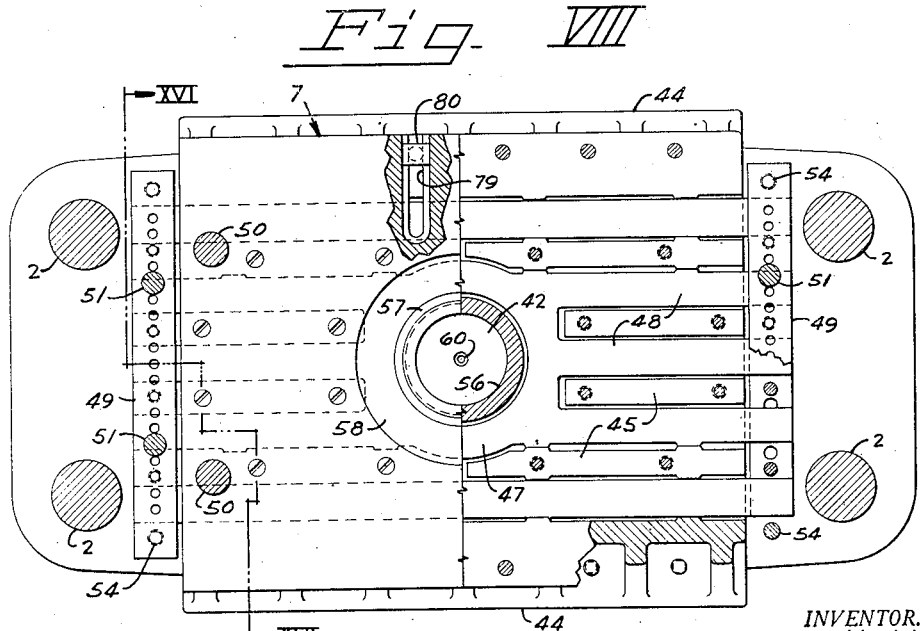
INVENTOR.
Keith W. Hall
BY
Marshall & Marshall
ATTORNEYS

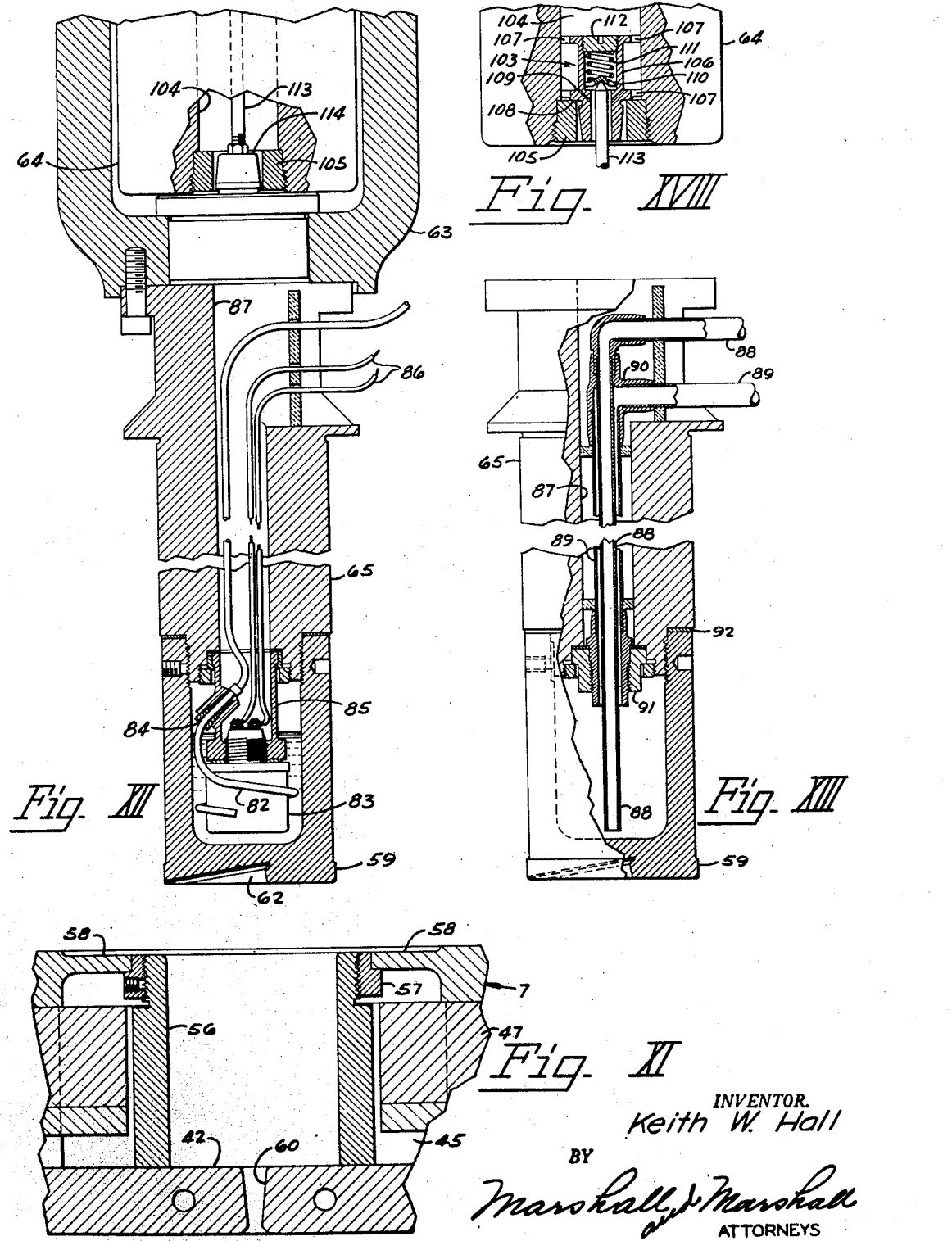

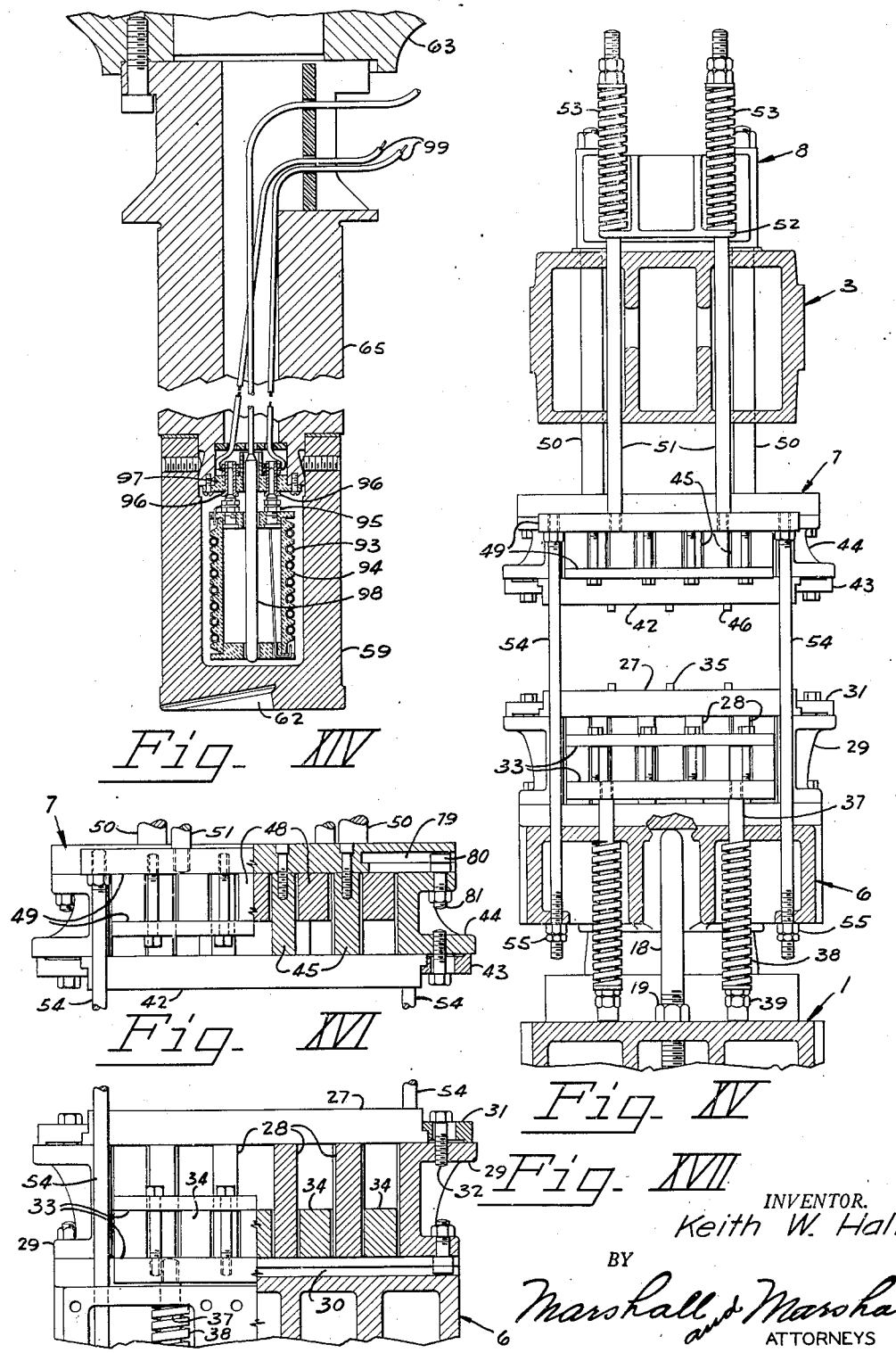

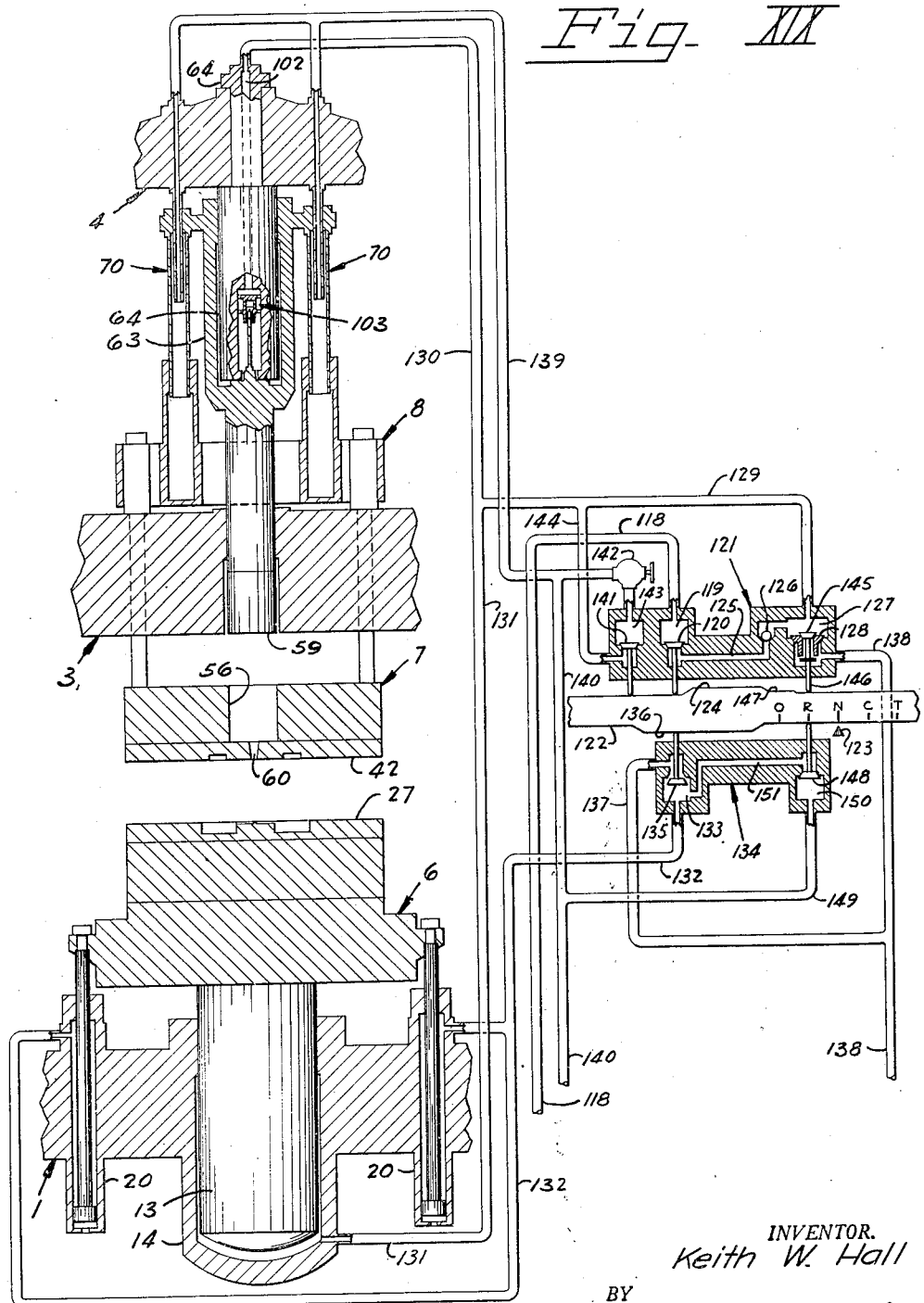

Patented Sept. 20, 1949

2,482,338

UNITED STATES PATENT OFFICE 2,482,338

MOLDING PRESS

Keith W. Hall, Toledo, Ohio, assignor to Defiance Machine Works, Inc., Defiance, Ohio, a corporation of Ohio Application June 12, 1945, Serial No. 599,099

15 Claims. (Cl. 18—30)

This invention relates to hydraulic presses used for molding plastics and in particular to a press adapted for either compression or transfer molding.

A simple hydraulic press is satisfactory for compression molding because the operation consists of only the steps of placing a charge of plastic material, either a preform or a quantity of powder, in each cavity of the heated mold and closing the press to apply pressure to the material. The press is held closed long enough for the material to cure, i. e. polymerize, after which it is opened and the finished product removed. Any hydraulic press capable of producing sufficiently high pressures may be used for compression molding.

Transfer molding differs from ordinary compression molding in that the plastic material, usually in the form of a preheated preform, is placed in an auxiliary chamber and, after the mold is closed, is forced through a nozzle or a nozzle and runners into the mold cavity or cavities. The auxiliary chamber from which the plastic material is forced into the mold is commonly called a "transfer pot." When an ordinary press is used for transfer molding the transfer pot is built into the upper die, which is allowed to float intermediate the lower die and the fixed head of the press. In this arrangement the dies are closed to form the mold during the first part of the stroke of the ram, after which the whole assembly is pushed up against a plunger attached to the head so that the plunger forces the material from the pot into the mold cavities. This arrangement requires that, depending upon the flow characteristics of the material, the area of the transfer pot must equal or exceed the projected area of the mold cavities in order to maintain sufficient pressure on the dies to prevent them from separating as the last of the plastic material is forced into them.

A large-area transfer pot is wasteful of molding material because of the comparatively large amount left in the pot at the end of each cycle. This remainder is partially cured and worthless. Any attempt to reduce this waste by driving the transfer punch deeper into the pot fails because the material in the bottom of the pot, being in contact with the heated die, tends to cure or lose its fluid nature before it can be forced toward the nozzle. Another disadvantage of the large area transfer pot is its unfavorable effect on the attainment of uniform cure in the molded product. The large exposed area increases the distance from the edge of the pot to the nozzle and the material flowing through this distance tends to partially cure before it can be transferred to the mold.

The principal object of this invention is to provide an easily operated hydraulic press suitable for use in the transfer molding of plastics.

Another object of the invention is to provide a transfer molding press in which the transfer pot is separate from the die, thereby greatly simplifying the die and lowering its cost.

Another object of the invention is to provide a transfer molding press adapted for either top or bottom ejection.

Another object is to provide means for holding a transfer pot securely in contact with a die without setting up distorting strains in the die when it is closed under clamping pressure.

Another object is to so arrange those parts of the hydraulic system that are located above the dies as to minimize the possibility of fluid leakage and the danger of the oil contaminating the molded product.

A still further object is to provide interchangeable transfer punches and transfer pots which may be changed independently of the dies and which allow the transfer punch to be heated from within to secure the heat distribution required to best utilize the flow characteristics of the plastic material.

Transfer molding as a process is intermediate between and has some of the features of both compression molding and injection molding. It was originated to secure means for molding thermosetting materials to the intricate shapes formerly obtainable only with injection molding. Thermosetting materials cannot be used in the ordinary injection molding machine because they tend to polymerize or harden in the injection nozzle between injection cycles. Thermosetting materials act in the same manner in a transfer molding press but in this case only enough material is put into the transfer pot, which corresponds to the injection cylinder, to provide one fill of the mold. The material left in the bottom of the pot and in the connecting passage or nozzle leading into the mold also cures during the cycle and, at the end of the cycle, is removed and discarded as waste. In the interest of minimizing the waste material and securing minimum flow in the transfer pot it is desirable that the transfer pot have a comparatively small cross-sectional area.

The invention attains the objects mentioned and permits simple operation of a transfer molding cycle by controls of the type ordinarily associated with compression molding. To accomplish this the press is built with a floating platen to support the transfer pot and the upper die, and is so arranged that when the floating platen is in its lower position the pot may be loaded for the next cycle. When the dies are closed by admitting low pressure fluid to the main cylinder of the press, the floating platen is pushed up against the head of the press.

In parallel with the main cylinder the pressure fluid is admitted to an auxiliary or transfer cylinder where it tends to push a transfer ram into contact with the material in the transfer pot. As soon as the dies are closed, high pressure is applied to the main and transfer cylinders, the main cylinder then acting to hold the dies closed and the transfer cylinder acting to force the plastic material from the transfer pot into the mold cavities. After the material in the mold has cured the pressure is removed from the cylinders and high pressure is applied to pull-back cylinders arranged to separate the dies and to withdraw the transfer punch from the transfer pot. Suitable ejectors are provided to eject the molded articles from the dies. The waste material is removed from the face of the transfer punch as the next charge is loaded into the transfer pot. By thus combining the motions of the main and auxiliary cylinders with the motion of the floating platen it is possible to secure the advantages of injection molding with the simplicity of control associated with compression molding.

An important constructional feature of the press is a resilient member for holding a transfer pot against the die in such a manner that leakage of the plastic material is prevented, that no mold clamping force is transmitted through the pot, and that no distorting strain is put on the die itself. This feature permits ejection pins to be located very close to the transfer pot and as a consequence materially shortens the length of runners required in the mold. Another feature is the use of an inverted cylinder as the auxiliary or transfer cylinder thereby securing a structure in which any leakage of the pressure fluids used to actuate the cylinders can be easily kept from the dies and plastic material. Other features such as a novel arrangement of the push-back cylinders, heating means for an interchangeable transfer punch, and the provision for either top or bottom ejection or both, contribute to the versatility of the press.

The invention is illustrated by a specific example of a hydraulic press uniquely adapted for use in transfer molding of thermosetting resins or plastics. The description of this example, including the drawings, is intended merely to illustrate the invention and not to impose limitations on the claims.

In the drawings:

Figure I is a front elevation of a hydraulic press adapted for transfer molding.

Figure II is a side elevation of the press.

Figure III is a vertical section through the lower part of the press shown in Figure I.

Figure IV is a horizontal section taken through the base of the press substantially along the line IV—IV of Figure III.

Figure V is a horizontal section through the upper part of the base of the press taken substantially along the line V—V of Figure III.

Figure VI is a vertical section through the upper part of the press showing the parts in the "mold open" position.

Figure VII is similar to Figure VI but showing the parts in the "mold closed" position.

Figure VIII is a horizontal section taken through the upper part of the press substantially along the line VIII—VIII of Figure VI.

Figure IX is a horizontal section through the upper part of the press taken substantially along the line IX—IX of Figure VI.

Figure X is a plan view, partly in section, of the upper head of the press taken along the line X—X of Figure I.

Figure XI is a vertical fragmentary section showing the transfer pot and the adjacent parts of the follower and mold.

Figure XII is an enlarged fragmentary sectional view of the transfer punch showing one means of heating the punch.

Figure XIII is a fragmentary section showing another means of heating the transfer punch.

Figure XIV is also a vertical section showing the preferred method of heating the punch.

Figure XV is a fragmentary side elevation of the press, as seen from the line XV—XV shown in Figure I, showing the mechanism for ejecting pieces from the molds.

Figure XVI is a fragmentary end elevation of the upper platen and mold as seen from the line XVI—XVI of Figure IX.

Figure XVII is a fragmentary end elevation of the lower platen and mold as seen from the line XVII—XVII of Figure V.

Figure XVIII is a fragmentary section showing the valving arrangement to control the motion of the transfer cylinder at the lower end of its stroke.

Figure XIX is a schematic view showing the hydraulic connections and system for operating the press.

*Press structure*

The hydraulic press incorporating the invention comprises a main base 1 from which four heavy side rods 2 are erected to carry a head 3 at their upper ends. A crosshead 4 is supported above the head 3 on auxiliary tie rods 5 erected from the head 3. The working parts of the press comprise a lower platen 6, an upper platen 7, a movable head 8 and a transfer press 9. The lower platen 6 is a substantially rectangular casting provided on its under surface with a series of ribs 10 radiating from a cylindrical center boss 11. The platen 6 is provided at each end with half bearings 12 which by engaging the side rods 2 guide the platen 6 during its vertical movement. The center boss 11 is counterbored from below to receive a top end of a main ram 13 which extends downward into a main cylinder 14 cast integrally with the base 1. To conserve weight and material the ram 13 is cast as a shell shaped like a wide mouth bottle. The ram 13 is guided by a bushing 15 fitted into the top of the cylinder 14 and pressure fluid is retained in the cylinder by a packing 16 held in place by a packing ring 17 bolted to the top of the cylinder 14. The bottom limit of travel of the platen 6 is limited by a pair of adjustable stop rods 18 threaded through the upper surface of the base 1 and locked in adjusted position by lock nuts 19. The platen 6 is pulled downwardly by a pair of pull-back cylinders 20 mounted in the sides of the base 1. Pistons 21, working in the pull-back cylinders 20, are connected through piston rods 22 to ears 23 extending laterally from the platen 6. The pistons 21 are provided with cup-shaped packings 24 to prevent leakage past them toward the bottom ends of the cylinders 20. The upper ends of the cylinders 20 are closed by packings 25 held in place by small packing rings 26 surrounding the piston rods 22.

A bottom die 27, the lower half of the mold, is supported from the face of the platen 6 by means of a series of support bars 28 and die support brackets 29. See Figure XVII. T slots 30 machined in the upper surface of the platen 6 accommodate the heads of bolts used for clamping the support brackets 29 in place. The die 27 is clamped to the top of the support brackets 29 by a series of step clamps 31 held in place by bolts 32. The support bars 28 are slipped in place between the platen 6 and the die 27 before it is clamped down. An ejector grid comprising end frames 33 and grid bars 34 is provided to actuate ejector pins 35 which when pushed into the die cavities dislodge molded pieces therefrom. The ejector grid bars 34 are sandwiched between the supports 28 and are allowed a limited amount of vertical motion. The ejector pins 35 are attached to the ejector grid bars 34 by any suitable means such as clamp plates 36. The ejector grid is carried on four ejector rods 37 one being located at each corner. These rods extend downwardly through holes in the platen 6 and are of such a length as to contact the upper surface of the base 1 slightly before the platen 6 has reached the bottom of its stroke. When the lower ends of the ejector rods 37 contact the base 1 the ejector grid is pushed upward with respect to the descending platen and die so that the ejector pins 35 eject the molded pieces. Coil springs 38 held in compression between lock nuts 39 on the bottom end of the ejector rods 37 and the lower surface of the platen 6 serve to retract the ejector pins as soon as the platen 6 starts upward on the next cycle.

The die 27 is provided with locating dowels 40 which engage hardened bushings 41 (Figure VII) located in a cooperating or upper die 42. The upper die 42 is clamped to the upper platen 7 by means of step clamps 43 and upper support brackets 44 (Figure XVI) and is separated from the platen 7 by a plurality of support bars 45. To facilitate assembly the support bars 45 are bolted to the upper platen 7. The upper die 42 is also provided with an ejection mechanism for actuating ejection pins 46. This mechanism comprises a grid having a circular center portion 47 (Figures VI and IX) and a series of laterally extending bars 48 which are clamped in end frames 49. The upper platen 7 is suspended by means of four supporting rods 50 which extending upwardly through the head 3 are secured in the movable head 8. The supporting rods 50 are allowed a small amount of lateral freedom in their connection to the upper platen 7 to allow for the expansion of the platen 7 when heated dies are used. Ejector grid support rods 51 secured to the ejector end frames 49 also extend upwardly through the head 3 and through holes in shelves 52 extending from the sides of the movable head 8. Coil springs 53 circumjacently mounted on the grid support rods 51 above the shelves 52 pull the ejector frame up with respect to the platen 7. Inasmuch as the movable head 8 and the upper platen 7 move together the support rods 51 cannot be used to operate the upper ejector system. Therefore, depending rods 54 connected to the end frames 49 of the upper ejector system are extended downwardly through the platen 6 and are equipped with lock nuts 55 threaded on their lower extremities. The lock nuts 55 are adjusted so that the upper ejector system is actuated as the lower platen reaches the end of its stroke. The cooperation of the various parts of the ejector system is shown in Figure XV.

The upper plate 7 in addition to carrying the mold 42 also carries a transfer pot 56 (Figures VI and XI). The transfer pot 56 is a plain cylinder open at each end. The lower end is ground square and rests against the upper surface of the upper die 42. It is held securely in contact with that surface by a threaded ring 57 which presses upward against an annular spring 58 formed in the upper platen 7. The upper surface of the platen 7 surrounding the transfer pot 56 is relieved so that when the mold is closed and the platen 7 is pressed into contact with the lower surface of the head 3 no additional force is transmitted through the walls of the transfer pot 56 which forces, if present, would distort the upper mold 42. For the same reason the length of the transfer pot 56 is made slightly less than the combined height of the support bars 45 and the thickness of the platen 7. This relationship is shown in Figure VII which shows the parts in the positions that they occupy when the mold is closed and the resin or plastic has been injected into the mold.

It will be noted that this construction affords ample space for loading the transfer cylinder when the floating platen 7 is in its lower position and that the platen 7 is firmly and evenly supported by the stationary head 3 when in its upper position. The die 42 attached to the platen 7 has nearly continuous support over its whole area. The support bars 45 are quite closely spaced and closely approach the transfer pot 56, being separated therefrom only by the narrow ring of the upper ejector grid. Inasmuch as the die has little unsupported area it is free from bending stress and can therefore be of relatively light section. In transfer presses employing a fixed upper die support the space required for loading the transfer pot robs the die of much needed support. The bridging across the feeding space sets up rather severe bending stresses and very materially increases the strength requirements of the die. Even the reinforcement of a heavy die does not prevent some bending and consequent variation in the molded part.

After the mold is closed and while it is held clamped as it is shown in Figure VII plastic material which was placed within the transfer pot 56 is forced by a transfer ram 59 of the transfer press 9 through a nozzle 60 into runners 61 which lead to the mold cavities. The nozzle 60 is formed in the upper die 42 and is flared toward each surface of the die, the point of greatest restriction being near the bottom surface adjacent the runners 61. When it is formed in this way the sprue, the waste material left in the nozzle, is broken at the point of greatest restriction and the greater part of it is taken up with the transfer ram 59 as it is withdrawn from the transfer pot 56. To ensure the removal of the sprue and of the waste material left in the bottom of the transfer pot the bottom of the transfer ram 59 is formed with a tapered T slot 62 (see also Figure XII) which allows the transfer ram 59 to withdraw the waste material from the transfer pot 56.

The transfer ram 59 of the transfer press 9 is driven by a transfer cylinder 63 which is slidably mounted on a piston 64 attached to the upper crosshead 4. An extension 65 of the transfer cylinder 63 carrying the transfer ram 59 is guided by a bushing 66 secured in the head 3 of the press. The upper end of the transfer cylinder 63 is provided with a suitable guide bushing 67 and packing 68 held in place by an upper packing ring 69.

The transfer cylinder 63 is returned to its upper position and the movable crosshead 8 is simultaneously urged toward its bottom position by a pair of push backs 70. These push backs are each composed of three telescoping cylinders or tubes 71, 72 and 73. The largest and lowest tube 71 is secured in the movable head 8, its lower end being closed and its upper end being provided with a suitable packing joint 74 to receive the next cylinder 72 as a piston rod. The bottom of the second or intermediate cylinder 72 is open. Its upper end extends through and is clamped in an ear 75 extending laterally from the top end of the transfer cylinder 63 by lock nuts 76 and 77. It is provided with a seal 78 to receive the smallest tube 73 of the group. The tube 73 is secured in the crosshead 4 and is connected to the hydraulic system. These push backs thus act to withdraw the transfer ram 59 from the transfer pot 56 and to return the movable crosshead 8 and the movable platen 7 to their normal positions as soon as the mold is opened. The principal force exerted by the push backs 70 is between the transfer cylinder 63 and the movable crosshead 8, this force acting to break the sprue in the nozzle 60 and to withdraw the transfer ram 59 from the transfer pot 56.

An advantage derived from this design is that in practically every case the packing between relatively movable members is mounted in the outer member and therefore is readily accessible. This is particularly true in regard to those parts of the hydraulic system that are located above the molds. With the structure arranged in this manner it is comparatively simple to control the leakage fluid to prevent it from coming in contact with the plastic material either in the transfer pot or in the mold itself.

It will be noticed that the transfer pot 56 is supported by an annular spring formed in the center of the upper platen 7. Therefore, when machining the platen care must be taken that T slots 79 accommodating heads 80 of bolts 81 securing the die supports 44 are not cut through the central area of the platen.

When thermosetting materials are transfer molded the powder or preformed material is heated until it is semi-plastic, but not cured. The transfer pot into which the heated material is placed is also heated to approximately the same temperature because of its intimate contact with the heated mold. The transfer ram 59 however is exposed to the atmosphere for a large part of the time and tends to cool to a temperature so low as to be detrimental to the proper transfer of the material. To avoid this difficulty the invention contemplates heating the transfer ram 59 from within, several forms of heaters being readily adaptable for this purpose. One of these forms is shown in Figure XII. In this form the transfer ram 59 is a cup-like body secured to the lower end of the transfer cylinder extension 65. The ram 59 is filled with oil in which is immersed a thermostat bulb 82 and a cup 83 containing an electric heater. The thermostat 82 is taken through an oil tight seal 84 leading through a side wall 85 of the heater support and from that point it and the electric power connections 86 for the heater are led up through a passage 87 and out through a side opening in the top of the extension 65. This structure is assembled by first mounting the electric heater and the thermostat on the lower end of the extension 65 then screwing the prefilled ram 59 into place, thus immersing the heater and the thermostat in the oil.

It is also possible to heat the transfer ram 59 with steam, hot water or hot oil by arranging connections to it in the manner illustrated in Figure XIII. In this modification the passage 87 through the extension 65 of the transfer cylinder 63 is fitted with concentric pipes 88 and 89. The inner pipe 88 after passing through a pipe T 90 extends nearly to the bottom of the interior recess of the transfer ram and serves to admit the heating medium. The outer pipe 89 is connected into the bottom of the pipe T 90 and extends downwardly and is sealed into a sleeve 91 at the bottom of the extension 65. The transfer ram 59 where it is screwed onto the end of the extension 65 is provided with a gasket 92 so as to form a pressure tight connection. The sleeve 91 is also fitted with gaskets so that it also is pressure tight. The heating medium is fed in through the pipe 88 and after circulating about in the interior of the ram 59 is withdrawn through the outer concentric pipe 89. In this modification the temperature is controlled by controlling the temperature of the heating medium as it is fed in through the pipe 88.

A preferred form of heater is shown in Figure XIV. The preferred form eliminates the inconvenience and dangers incident to the possible leakage of oil or other heating medium by employing an electric heater of the radiant type located within the transfer ram 59. The radiant heater consists of a resistance wire 93 wound on a ceramic form 94 and connected to a pair of "plug-in" terminals 95 mounted on one end of the ceramic form 94. Electrical sockets 96 mounted in an insulator 97 secured to the lower end of the transfer cylinder extension 65 serve to support and to transmit electrical power to the heater. A thermostat bulb 98 extends into the hollow central part of the heater and is responsive to its temperature. The connection to the thermostat 98 and electrical power leads 99 are brought up through the interior of the extension 65 and out to one side just below the cylinder 63. While the ceramic cylinder 94 is shown as having a solid wall with a helical groove in its outer surface it is sometimes necessary to cut slots through the wall so that the thermostat bulb 98 is exposed to radiant energy from the resistance wire 93. Without the slots it is possible that the temperature may fluctuate quite widely because of the poor heat conductance to the thermostat bulb.

To avoid continually flexing the lead to the thermostat 98 its control box 100 is located on the side of the transfer cylinder 63. From the control box 100 a flexible cable 101 is carried off to a stationary part of the press frame where it may be connected to wiring installed in rigid conduit. A similar arrangement of flexible and rigid connections are used for the oil immersed heater or the steam heater previously described.

The pressure fluid for operating the transfer cylinder is supplied through a passage 102 drilled axially through the piston 64. In operating a press it is desirable in order to save time that the moving parts move rapidly when not under load. Therefore, the connections to the transfer cylinder 63 including the passage 102 are made amply large. However, if the press were operated with no material in the transfer pot the ram would probably strike the bottom of the pot and be damaged. To eliminate this possibility a throttling valve 103 is built into the lower end of the piston 64. The bottom end of the passage 102 is bored out to form a valve chamber 104. A ring 105 threaded into the bottom end of the chamber 104 forms both a valve seat and a partial restriction to the flow of fluid. A valve body 106 formed with guiding fins 107 has a circular flat surface 108 adapted to seat on the upper surface of the ring 105 and when seated to restrict the flow to several small diameter holes 109. The lower part of the valve body 106 below the plane of the surface 108 is in the form of a truncated cone having its larger diameter at its upper end. Its larger diameter is nearly equal to the bore through the ring 105. The valve body 106 is bored out, the lower conical portion to a small diameter and the upper part to a larger diameter. A small spider 110 is fitted into the larger bore and is pressed downwardly by a helical spring 111 which in turn is held in place by a threaded plug 112. The valve body 106 is prevented from sealing off the opening through the ring 105 before the transfer cylinder 103 has reached the bottom of its stroke by a thin rod 113 which is tapped into the upper base of a truncated cone 114 formed in the closed end of the transfer cylinder 63. As the cylinder 63 approaches the end of its stroke, if it is moving slowly the valve body 106 slowly cuts off the flow of fluid past it and does not seat on the ring 105 until the stroke is substantially complete. However, if the transfer cylinder 63 is moving rapidly the high rate of flow past the valve body 106 and through the ring 106 sucks the valve body 106 down compressing the spring 111 so that the flow is cut off some distance back from the end of the stroke and the remainder of the stroke is then completed at a speed determined by the oil flow through the small holes 109 in the valve body 106. The restriction thus afforded is sufficient to reduce the velocity of the cylinder transfer 63 and the transfer ram attached thereto to a safe value.

When the transfer cylinder 63 is moving in the other direction and approaching the end of its stroke the truncated cone 114 enters the ring 105 to restrict the flow and thus reduce the velocity to a safe value. The deceleration is gradual because the restriction afforded by the truncated cone 114 changes according to the distance which the cone has entered into the ring 105. The truncated cone 114 of course restricts the flow of fluid back into the cylinder 63 at the start of the stroke. But this restriction offers an advantage in that it is desirable that the main cylinder of the press close the dies and raise the floating platen against the fixed head before the transfer ram cones into contact with the plastic material or perform in the transfer pot. The restriction is not sufficient to completely achieve this result but affords somewhat better operation than if it were entirely absent.

Dies which are used for transfer molding vary greatly in depth according to the complexity and size of the piece to be molded. In the illustration relatively thin dies are shown. When thicker dies are used the available space between them when they are open is materially reduced and may be so small as to seriously interfere with the removal of the molded pieces. To eliminate this difficulty the upper ends of the side rods 2 are provided with a series of square grooves 115 (see Figure VII). The bottom surface of the head 3 is counterbored to receive split washers 116 which are adapted to fit in the grooves 115. When a change in height of the head 3 is required retaining nuts 117 threaded onto the top ends of the side rods 2 are unscrewed, blocking is placed between the platens and the main cylinder is used to raise the head 3 enough to release the split washers 116 and allow them to be relocated in that one of the grooves 115 which will give the desired height. After being so located the head is lowered onto the split rings 116 and the nuts 117 are tightened. In this manner variations in mold thickness may be accommodated without disturbing the operation of the rest of the machine.

Hydraulic system

The arrangement of this press is such that a two-pressure hydraulic system, such as is commonly used with compression molding presses, can be satisfactorily used for transfer molding. A simple hydraulic circuit adapted to operate the press is shown in Figure XIX. When it is desired to close the press, i. e. close the mold, hydraulic fluid from the low pressure system is allowed to flow through a pipe 118 into a valve chamber 119 over a poppet valve 120 contained in a valve body 121. The poppet valve 120 is opened by moving a slide bar 122 to the left one space— to the "close mold" position indicated by the "C" on the bar being in registration with a stationary index 123. When moved to such position the stem of the poppet valve 120 rests on a raised cam portion 124 of the slide bar 122. With the poppet valve 120 open the low pressure hydraulic fluid is allowed to flow through a passage 125 in the valve body 121, past a check valve 126 and into a chamber 127 over a double poppet valve 128. The chamber 127 is connected through pipes 129 and 130 to the transfer cylinder 63 and through the pipe 129 and another pipe 131 to the main cylinder 14. The low pressure applied in the main cylinder 14 forces its piston 13 upwardly thus raising the lower platen 6 so that the die 27 carried thereby contacts the upper die 42 and carries it and the floating platen 7 upwardly until the platen 7 bears against the fixed head 3.

During the upward movement of the platen 6 hydraulic fluid is exhausted from the pull-back cylinders 20 through pipes 132 connected to a valve chamber 133 in a valve body 134. A poppet valve 135, opening into the chamber 133 and held open in the "close mold" position of the slide bar 122 by another raised cam portion 136 of the slide bar, permits the hydraulic fluid to pass from the valve chamber 133 and out through a pipe 137 leading to an exhaust pipe 138.

The low pressure applied through the pipes 129 and 130 to the transfer cylinder 63 does not produce any movement of the transfer cylinder because the push back cylinders 70 are continuously connected through a pipe 139 to a pipe 140 leading to a source of high pressure fluid. The ratio of areas of the push back cylinders 70 to the transfer cylinder 63 is less than the ratio of the applied low pressure to the applied high pressure. If the ratios were equal and the friction of the packing joints were small enough the transfer cylinder would drop because of its own weight. However with the pressures commonly used the high pressure in the push backs 70 overcomes the force of the low pressure in the transfer cylinder 63 and no motion of the transfer cylinder takes place.

After the press is closed by the application of the low pressure, the slide bar 122 is moved to the transfer position with the "T" in registry with the index 123 at which time the raised cam portion 124 of the slide bar 122 opens a poppet valve 141 so that high pressure fluid may flow from the pipe 140 through an adjustable choke valve 142, a chamber 143 over the poppet valve 141 and out through a pipe 144 connected into the pipe 129. The high pressure thus applied to the pipe 129 is transmitted to the main cylinder 14 where it acts to clamp the mold in closed position and to the transfer cylinder 63 where it acts to drive the transfer ram 59 of the transfer cylinder 63 downwardly into the transfer pot 56 so as to force plastic material therein through the nozzle 60 into the mold. When the high pressure is admitted into the pipe 129 by opening the poppet valve 141 the high pressure is also admitted to the valve chamber 127 but the fluid can not flow into the low pressure system because of the check valve 126.

As soon as the material in the mold has had time to cure the slide bar 122 is moved to the first step to the right of the neutral position this step being the "release" position and designated by an "R" on the slide bar. In this position the poppet valve 135 is still open so that the pull-back cylinders 20 are connected to the exhaust line 138, the poppet valves 120 and 141 are both closed so that neither high nor low pressure is applied to the main or transfer cylinders, and the first stage 145 of a double poppet valve 128 is open with its stem 146 resting on a low raised portion 147 of the slide bar 122. Raising the first stage 145 of the poppet valve 128 allows a small amount of hydraulic fluid to escape from the transfer and main cylinders through the poppet valve and into the exhaust line 138. The release of the pressure in the transfer cylinder 63 allows the high pressure in the push backs 70 to raise the transfer cylinder 63 and the ram 59 thereby withdrawing the ram 59 from the transfer pot 56. The releasing of the pressure in the main cylinder 13 allows the mold to open and the lower platen 6 to drop because of its own weight.

In case the mold does not open rapidly enough or does not open at all because of the friction of the molded pieces in the mold cavities the slide bar 122 is moved to the last position to the right, the "open mold" position indicated by an "O" on the slide bar, in which position the double poppet valve 128 is opened wide to provide free flow of fluid from the main and transfer cylinders to the exhaust, the poppet valve 135 is closed to prevent flow from the pulldowns 20 to the exhaust line 138 and another poppet valve 148 is opened to allow high pressure fluid to flow from the pipe 140 through a pipe 149, a valve chamber 150 over the poppet valve 148, and a passage 151 connected to the valve chamber 133 thereby admitting high pressure fluid to the pull-back cylinders 20 to positively lower the platen 6.

As soon as the press is fully opened the slide bar 122 is returned to its neutral position during which time the molded pieces may be withdrawn, the waste material removed from the face of the transfer press, and a new charge of plastic material placed in the pot 56. If inserts are to be placed in the mold the lower platen 6 must be raised a short distance to allow the extraction or knockout pins to be withdrawn from the mold cavities. This is accomplished by momentarily moving the slide bar 122 to the "close mold" position and then returning it to neutral. As long as the slide bar 122 is in the neutral position all the valves are closed with the exception of the valve between the pull backs 20 and the exhaust line 138 so that the platens remain in whatever position they may be.

It should be noted that this cycle of operations is the same as that used for ordinary compression molding and that therefore a transfer molding press embodying the invention may be substituted for a compression molding press without alteration of the controls or the supplies of fluid pressure.

The invention thus provides all the advantages of transfer molding with the simplicity of compression molding, provides an easily operated press in which the molding dies are very rigidly supported and which ample room in the way of openings is provided for loading a transfer pot, and for the insertion of inserts and the removal of molded pieces.

Having thus described the invention, I claim:

1. In a molding press adapted for transfer molding, in combination, a lower platen, an upper platen, a movable head capable of limited vertical motion for supporting the upper platen, means for raising said lower platen until it picks up the upper platen, a first head for limiting upward movement of the upper platen, a transfer pot mounted in said upper platen, a ram for forcing material from the pot, a second head fixedly mounted above the first head, ram driving means comprising a piston and cylinder, said driving means being operatively connected to the second head and the ram, and pushbacks having elements attached to the second head, the ram, and the movable head, said pushbacks serving to withdraw the ram from the transfer pot and to drive said movable head to its lower position.

2. In a vertically mounted transfer molding press having a hydraulically operated main platen, a second platen movably mounted above the main platen, a fixed head against which said main platen may force said second platen to exert pressure thereagainst and a transfer pot carried in the second platen, in combination, a ram for forcing plastic material from the pot, an upper head supported from the fixed head, a piston rigidly attached to the upper head, said piston having a longitudinal passage therethrough and a cylinder reciprocally mounted on said piston and provided with a downwardly projecting portion for carrying the ram.

3. In a transfer molding press, in combination, a platen, a die carried by said platen, a transfer pot mounted in said platen and pressed against said die, an ejector grid closely encircling said transfer pot, and ejector pins actuated by the grid and set in said die substantially adjacent the projected area of the pot.

4. In a transfer molding press in which plastic material is forced from a heated transfer pot into heated molding dies, in combination, a transfer ram for forcing material from said pot, a cup-shaped punch mounted on the end of the ram with its open end adjacent the ram, a radiant electric heater mounted on the end of said ram and extending into said cup-shaped punch with its heating element adjacent the wall of the punch, and a thermostat having a bulb generally surrounded by the heating element and exposed to the temperature within the cup-shaped punch and to radiant heat from said electric heater for controlling the temperature of said punch.

5. In a hydraulic press for transfer molding, in combination, a hydraulically operated main platen, a fixed head against which the main platen may exert pressure, a crosshead mounted on the fixed head, a floating platen located between the main platen and the fixed head, a movable head located between the fixed head and the crosshead and operatively connected to the floating platen, a die carried on the floating platen, a transfer pot carried in the floating platen in position to rest against and communicate with the die, a piston carried on the crosshead and extending toward the fixed head, a cylinder reciprocably mounted on the piston, a ram mounted on the cylinder in position to enter and force material from the transfer pot into the die, and hydraulic pushbacks acting between the cylinder and the movable head for withdrawing the ram from the transfer pot.

6. In a hydraulic press for transfer molding, in combination, a hydraulically operated main platen, a fixed head against which the main platen may exert pressure, a crosshead mounted on the fixed head, a floating platen located between the main platen and the fixed head, a movable head located between the fixed head and the crosshead and operatively connected to the floating platen, a die carried on the floating platen, a transfer pot carried on the floating platen and held against the die, a plurality of tubular pistons mounted on the crosshead and extending toward the fixed head, a cylinder reciprocably mounted on one of the pistons, a portion of the cylinder being engageable in the transfer pot to force material therefrom, and telescoping cylinders reciprocably mounted on others of said pistons and engaging the first cylinder and the floating head for withdrawing the portion from the transfer pot.

7. In a hydraulic press for transfer molding, in combination, a platen, a die carried by the platen, a transfer pot, and resilient means in the platen for holding the transfer pot against the die, whereby the transfer pot is held against the die independently of the pressure exerted by the hydraulic press.

8. In a hydraulic press for transfer molding, in combination, a platen, a die carried by the platen, a transfer pot comprising a tubular member open at each end, and resilient means acting between the platen and the transfer pot for holding the transfer pot against the die with the die forming the bottom of the transfer pot.

9. In a hydraulic press for transfer molding, in combination, a platen, a die carried by the platen, a transfer pot in communication with the die, and an annular diaphragm formed in the platen for holding the transfer pot against the die.

10. In a hydraulic press for transfer molding, in combination, a platen, a die carried on the platen, a transfer pot in communication with the die, the transfer pot comprising a cylindrical tube open at each end, a ring threaded on the outside of the transfer pot, and resilient means extending from the platen and engaging the ring for holding the transfer pot against the die.

11. In a hydraulic press for transfer molding, in combination, a platen, a die carried on the platen, a transfer pot in communication with the die, the transfer pot comprising a cylindrical tube open at each end, a ring threaded on the outside of the transfer pot, and an annular diaphragm formed in the platen and engaging the ring for holding the transfer pot against the die.

12. In a hydraulic press for transfer molding, in combination, a main platen, means for driving and supporting the main platen, a fixed head, a floating platen located between the main platen and the fixed head, a crosshead mounted from the fixed head, a movable head mounted between the fixed head and the crosshead and connected to the floating platen, a piston mounted on the crosshead and extending toward the fixed head, a pressure cylinder reciprocably mounted on the piston, a portion of the pressure cylinder constituting a ram that extends through the fixed head, a transfer pot mounted in the floating platen in line with the ram, said ram being adapted to force material from the transfer pot, and pushback means comprising tubular pistons extending from the crosshead, intermediate cylinders mounted on the tubular pistons and connected to the pressure cylinder and outer cylinders mounted on the intermediate cylinders and connected to the movable head for extracting the ram from the transfer pot and retracting the pressure cylinder.

13. In a transfer molding press, in combination, a floating platen, a transfer pot, a mold part, said transfer pot and mold part being carried on the platen, an auxiliary hydraulic cylinder for transferring material from the transfer pot to the mold, a floating head located between relatively fixed portions of the press one of which portions supports the piston for the auxiliary hydraulic cylinder, said floating head being connected to the floating platen, and a three element hydraulic pushback having a first element attached to floating head, a second element attached to the auxiliary hydraulic cylinder and a third element attached to a fixed portion of the press for retracting the auxiliary cylinder on its piston and driving the movable head and the movable platen away from the auxiliary cylinder.

14. In a transfer molding press, in combination, a floating platen, a transfer pot, a mold part, said transfer pot and mold part being carried on the platen, an auxiliary hydraulic cylinder for transferring material from the transfer pot to the mold, a floating head located between relatively fixed portions of the press one of which portions supports the piston for the auxiliary hydraulic cylinder, said floating head being connected to the floating platen, and a three element hydraulic pushback having a tubular piston mounted on a fixed portion of the press, an intermediate cylinder reciprocably mounted on the tubular piston and attached to the auxiliary cylinder, and an outer cylinder reciprocably mounted on the intermediate cylinder and attached to the movable head.

15. In a transfer molding press having a base, an intermediate head carried from the base and a crosshead mounted in fixed relation to the intermediate head, and a hydraulic cylinder and main platen for exerting force against the intermediate head, in combination, a floating platen located between the main platen and the intermediate head, a movable head connected to the floating platen and located between the intermediate head and the crosshead, a transfer pot carried on the movable platen, hydraulically actuated means having a fixed portion mounted on the crosshead and a movable portion engaging the transfer pot for forcing material therefrom, and an auxiliary piston and cylinder mounted on the movable head and engaging the movable portion for retracting the movable portion from the transfer pot and driving the movable platen away from the fixed head.

KEITH W. HALL.

REFERENCES CITED

The following references are of record in the file of this patent:

UNITED STATES PATENTS

| Number | Name | Date |
|---|---|---|
| 1,865,464 | Geyer | July 5, 1932 |
| 1,916,495 | Shaw | July 4, 1933 |
| 1,993,942 | Novotny | Mar. 12, 1935 |
| 2,273,713 | Sawyer | Feb. 17, 1942 |
| 2,322,200 | Tucker | June 15, 1943 |
| 2,351,582 | Bohrer | June 20, 1944 |